June 2, 1959     M. W. DUNNING     2,888,993
LAWN EDGER
Filed Aug. 1, 1956
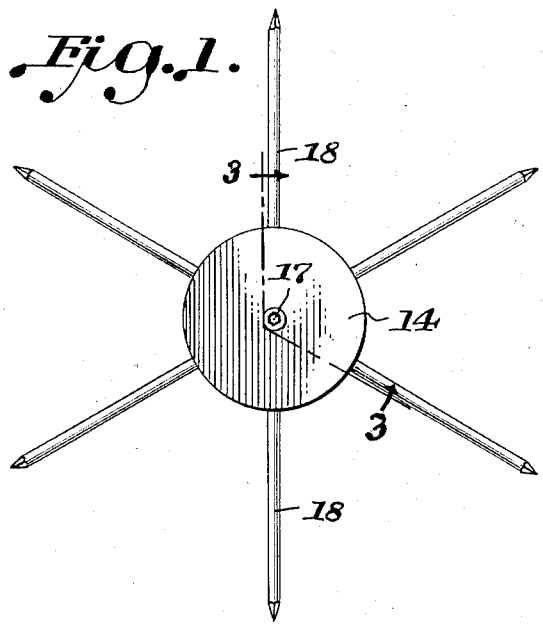
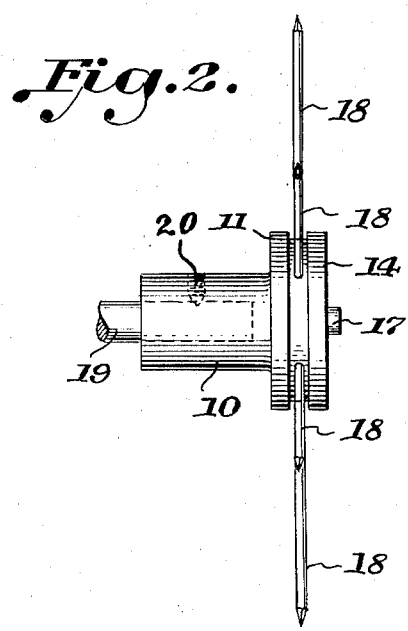
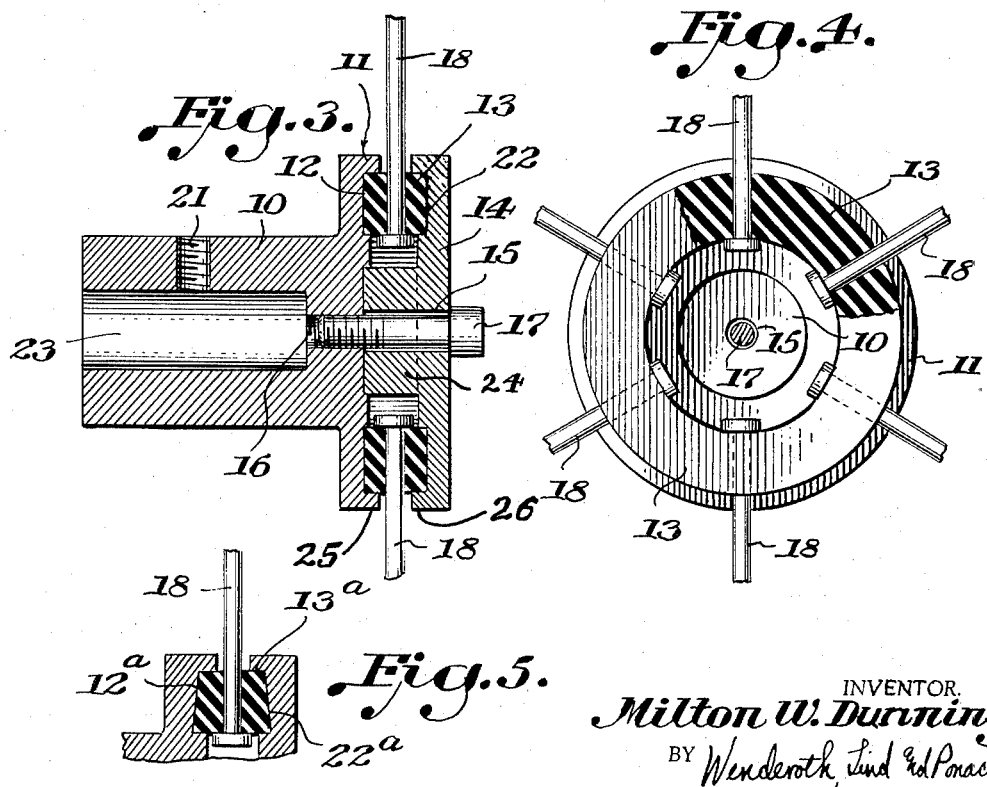
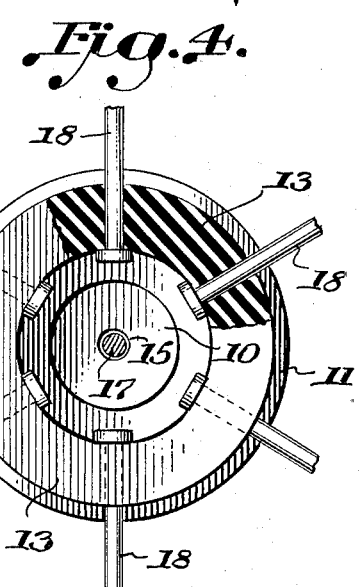
INVENTOR.
Milton W. Dunning,
BY Wenderoth, Lind & Ponack
ATTYS.

United States Patent Office 2,888,993
Patented June 2, 1959

2,888,993

LAWN EDGER

Milton W. Dunning, Santa Ana, Calif.

Application August 1, 1956, Serial No. 601,476

4 Claims. (Cl. 172—15)

This invention relates to a lawn edger, and more particularly to a high speed head for a lawn edger which head can be attached to a high speed rotating shaft and which has inexpensive and easily replaceable elements.

Heretofore lawn edgers and devices adaptable for use as lawn edgers have generally been somewhat complex and consequently rather expensive to produce. In particular, the cutting elements thereof have been the parts which are the most expensive and which receive the most wear, and consequently the parts which must either be replaced or the edger discarded. The problem of overcoming the wear on the cutting element, or in the alternative devising a structure in which the elements can be readily replaced and are themselves inexpensive, has not, to date, been successfully solved.

It is an object of the present invention to provide a high speed head for a lawn edger which overcomes the drawbacks of prior art lawn edgers.

It is a further object of the present invention to provide a lawn edger in which the cutting elements are nails, spikes, or plain wires with an effective head formed thereon, which can be easily replaced in the head at a nominal cost.

It is a still further object to provide a high speed head for a lawn edger which can be attached to a high speed rotating shaft, such as on a power lawnmower or power driven hand tool with a rotating shaft.

Other and further objects of the present invention will become apparent from the following specification and claims taken together with the appended drawing in which:

Fig. 1 is an end view of the high speed head for a lawn edger according to the present invention;

Fig. 2 is a side elevation view of the high speed head for a lawn edger of Fig. 1;

Fig. 3 is an enlarged sectional view of the high speed head for a lawn edger of Fig. 1 taken along line 3—3;

Fig. 4 is an enlarged view, partly in section, of the high speed head for a lawn edger of Fig. 1 with the end cover removed therefrom; and Fig. 5 is a fragmentary cross section of a modified form of rubber ring.

The high speed head for a lawn edger according to the invention comprises a hub 10 having an axial bore 23 in one end thereof. A threaded hole 21 is provided in the wall of the recess into which set screw 20 is threaded to secure the hub 10 to a shaft 19. The shaft 19 may be the shaft of a power tool, or may be a stub shaft for insertion into a chuck on the shaft of a power driven tool.

On the end of hub 10 opposite the bore 23 is a flange 11 having an annular grove 12 therein adjacent the periphery of the flange on the side thereof away from the hub. On the face of flange 11 at the outer edge of the groove 12 is a shoulder 25 extending in a direction away from the hub 10. A threaded axial hole 16 is provided in the end of the hub 10 opening from the end of the hub on which flange 11 is located.

An end cover 14 of substantially the same size as the flange 11 and having an axial projection 24 is positioned with the projection 24 against the end of the hub 10 on which flange 11 is located. The projection 24 serves to space the end cover 14 from flange 11. A central hole 15 is provided in the end cover and a single headed bolt or screw 17 is inserted through the hole 15 and threaded into the threaded hole 16 to hold the parts of the device in the assembled position.

End cover 14 has an annular groove 22 therein adjacent the periphery thereof on the side thereof facing flange 11, which groove is opposed to groove 12. End cover 14 also has a shoulder 26 on the face thereof facing flange 11, which shoulder is spaced from and opposed to shoulder 25. In the grooves 12 and 22, which are spaced from each other by virtue of the axial projection 24 on the end cover 14, is clamped a rubber ring 13 having a plurality of radially extending apertures therein. A plurality of nails 18, preferably common 16 penny nails, are inserted through the holes in ring 13 pointing outwardly with the heads of the nails against the inner periphery of the ring.

After nails 18 have been inserted through ring 13, the ring is positioned in the groove 12 and the end cover 14 is fastened to the hub 10 by means of headed bolt 17. The hub 10 is then positioned on the shaft 19 and locked in place by setscrew 20. The high speed head is then used until the nails are worn sufficiently so that they no longer function adequately. The device is then dismantled, the worn nails 18 removed, and new nails inserted in their place.

It is not necessary that the nails be shorter than the inside diameter of the rubber ring 13 in order that they can be inserted into the ring. The rubber ring is made sufficiently flexible so that nails of any length can be readily inserted by twisting the ring slightly.

Fig. 5 shows a modification of the device in which the rubber ring 13a is trapezoidal in cross section with the base of the trapezoid forming the inner periphery of the ring. Grooves 12a and 22a are correspondingly shaped.

The width of the annular space between the shoulders 25 and 26 of the flanges 11 and 14 should be less than the diameter of the nail heads to prevent any of the nails 18 from flying out under the influence of the high rotative speed of the tool, in the event a rubber ring should fail.

An essential and important requirement for the head according to the invention is its peripheral velocity. A high peripheral speed of the head is essential in order to prevent too large a bite per cutting element being taken by the head, and more important, in order to cause the cutting elements to be carried through the cut in the lawn by virtue of the inertia stored in them. This prevents excessive flexure of the rubber ring in which the cutting elements are mounted. Some flexure of this rubber ring is necessary to permit the individual nails forming the cutting elements to slow down in order to give up some of their kinetic energy to the material being removed from the cut, but the speed must remain sufficiently high so that the nails will not slow down to such an extent that the rubber holding them is overstressed due to the slowing action. As the slowing down can only be caused by the backward movement of the tips of the nails relative to their heads which are anchored in the rubber ring, a flexible mounting which has been provided in the form of the rubber ring is mandatory.

It will be seen that there has been provided a high speed head for a lawn edging device which is readily attachable to almost any type of power tool, and which is extremely simple to construct and maintain, and in which the cutter elements are inexpensive nails which can be easily procured and replaced when they are worn.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A high speed head for a lawn edger comprising a hub, a flange on one end of said hub, an end cover of substantially the same size as said flange, a single bolt extending through said end cover and threaded into said hub for attaching said end cover to said hub with said cover spaced from said flange, said flange and said cover having opposed grooves therein adjacent the peripheries thereof, a rubber ring clamped in said grooves between said end cover and said flange, and a plurality of common wire nails consisting of a pointed shaft and a head integral therewith and inserted radially outwardly through said ring with the heads against the inner periphery of said ring and the shafts of said nails extending between said flange and said end cover and being spaced from each of them.

2. A high speed head for a lawn edger as claimed in claim 1 in which said grooves are rectangular in cross section and said rubber ring is rectangular in cross section.

3. A high speed head for a lawn edger as claimed in claim 1 in which said rubber ring is trapezoidal in cross section with the base on the inner periphery of the ring and said grooves are shaped to receive said trapezoidal shaped ring.

4. A high speed head for a lawn edger as claimed in claim 1 and spaced opposed shoulders on the outer edges of said flange and said cover, said shoulders being spaced from each other a distance less than the diameter of the heads of said nails.

References Cited in the file of this patent

UNITED STATES PATENTS

| | | |
|---|---|---|
| 416,982 | Young | Dec. 10, 1889 |
| 1,244,982 | Horst | Oct. 30, 1917 |
| 1,456,860 | Turner | May 29, 1923 |
| 2,050,739 | Sieverkropp | Aug. 11, 1936 |
| 2,138,872 | Marogg | Dec. 6, 1938 |
| 2,202,929 | Silver | June 4, 1940 |
| 2,627,159 | Russell | Feb. 3, 1953 |
| 2,634,167 | Bible | Apr. 7, 1953 |

FOREIGN PATENTS

| | | |
|---|---|---|
| 163,538 | Australia | June 22, 1955 |